United States Patent
Ikeda et al.

(10) Patent No.: US 10,655,953 B2
(45) Date of Patent: May 19, 2020

(54) STRUCTURAL COLOR CHANGEABLE MATERIAL AND STRAIN DETECTION APPARATUS

(71) Applicant: KONICA MINOLTA, INC., Chiyoda-ku, Tokyo (JP)

(72) Inventors: Kazuki Ikeda, Hachioji (JP); Makoto Ooki, Toyohashi (JP); Hideo Uemura, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/696,867

(22) Filed: Sep. 6, 2017

(65) Prior Publication Data
US 2018/0066937 A1  Mar. 8, 2018

(30) Foreign Application Priority Data
Sep. 6, 2016 (JP) .................. 2016-173622

(51) Int. Cl.
| G01B 11/16 | (2006.01) |
| G01N 21/25 | (2006.01) |
| G01L 1/24 | (2006.01) |

(52) U.S. Cl.
CPC ........... *G01B 11/16* (2013.01); *G01B 11/18* (2013.01); *G01L 1/241* (2013.01); *G01L 1/247* (2013.01);
(Continued)

(58) Field of Classification Search
CPC .................................. G01N 21/25–2021/258
See application file for complete search history.

(56) References Cited

U.S. PATENT DOCUMENTS

| 9,423,243 B1 * | 8/2016 | Ikeda ................. G01B 11/168 |
| 2007/0111002 A1 * | 5/2007 | Xia ........................ C08F 6/14 |
| | | 428/407 |

(Continued)

FOREIGN PATENT DOCUMENTS

| JP | 2006-028202 A | 2/2006 |
| JP | 2009-47501 A | 3/2009 |

(Continued)

OTHER PUBLICATIONS

Chinese Office Action dated May 8, 2019, issued in corresponding Chinese Patent Application No. 201710790311.6 with English Translation (19 pages).

(Continued)

*Primary Examiner* — Michael P LaPage
(74) *Attorney, Agent, or Firm* — Buchanan Ingersoll & Rooney PC

(57) ABSTRACT

A structural color changeable material includes a strain body and surface plasmon generating particles. In the strain body, a strain is produced by an external pressure or an internal change. The surface plasmon generating particles generate surface plasmon and are contained in the strain body. The surface plasmon is generated by an incident light with a wavelength of 2400 nm or less. A mean particle size of the surface plasmon generating particles is equal to or less than the wavelength of the incident light. The surface plasmon generating particles are periodically arranged parallel to an in-plane direction of a reflection surface of the incident light.

16 Claims, 3 Drawing Sheets

(52) U.S. Cl.
CPC ....... *G01N 21/25* (2013.01); *G01N 2021/258* (2013.01)

(56) References Cited

U.S. PATENT DOCUMENTS

| | | | |
|---|---|---|---|
| 2008/0103056 A1* | 5/2008 | Lin | B01L 3/5085 506/9 |
| 2010/0053598 A1* | 3/2010 | Kwon | G01B 11/16 356/32 |
| 2011/0116094 A1* | 5/2011 | Allsop | B82Y 20/00 356/445 |
| 2011/0285991 A1* | 11/2011 | Dal Negro | G01N 21/253 356/301 |
| 2014/0030821 A1* | 1/2014 | Ohtsuka | G01N 21/648 436/501 |
| 2014/0211195 A1* | 7/2014 | Barcelo | G01B 11/16 356/33 |
| 2015/0047467 A1* | 2/2015 | Ruud | C01B 21/06 75/338 |
| 2015/0118124 A1* | 4/2015 | Khorasaninejad | B82Y 15/00 422/429 |
| 2015/0267107 A1* | 9/2015 | Zhu | G01L 1/24 356/32 |
| 2017/0176272 A1* | 6/2017 | Yin | B82Y 30/00 |

FOREIGN PATENT DOCUMENTS

| | | | |
|---|---|---|---|
| JP | 2012-000994 A | 1/2012 | |
| WO | WO-2016020492 A1 * | 2/2016 | .......... G01N 33/533 |
| WO | 2016-105548 A1 | 6/2016 | |

OTHER PUBLICATIONS

Second Office Action dated Nov. 26, 2019 by the China National Intellectual Property Administration in corresponding Chinese Patent Application No. 201710790311.6 and English translation of the Office Action. (15 pages).

Notice of Reasons for Refusal dated Mar. 31, 2020 issued by the Japanese Patent Office in corresponding Japanese application 2016-173622 and English language translation (6 pages).

* cited by examiner

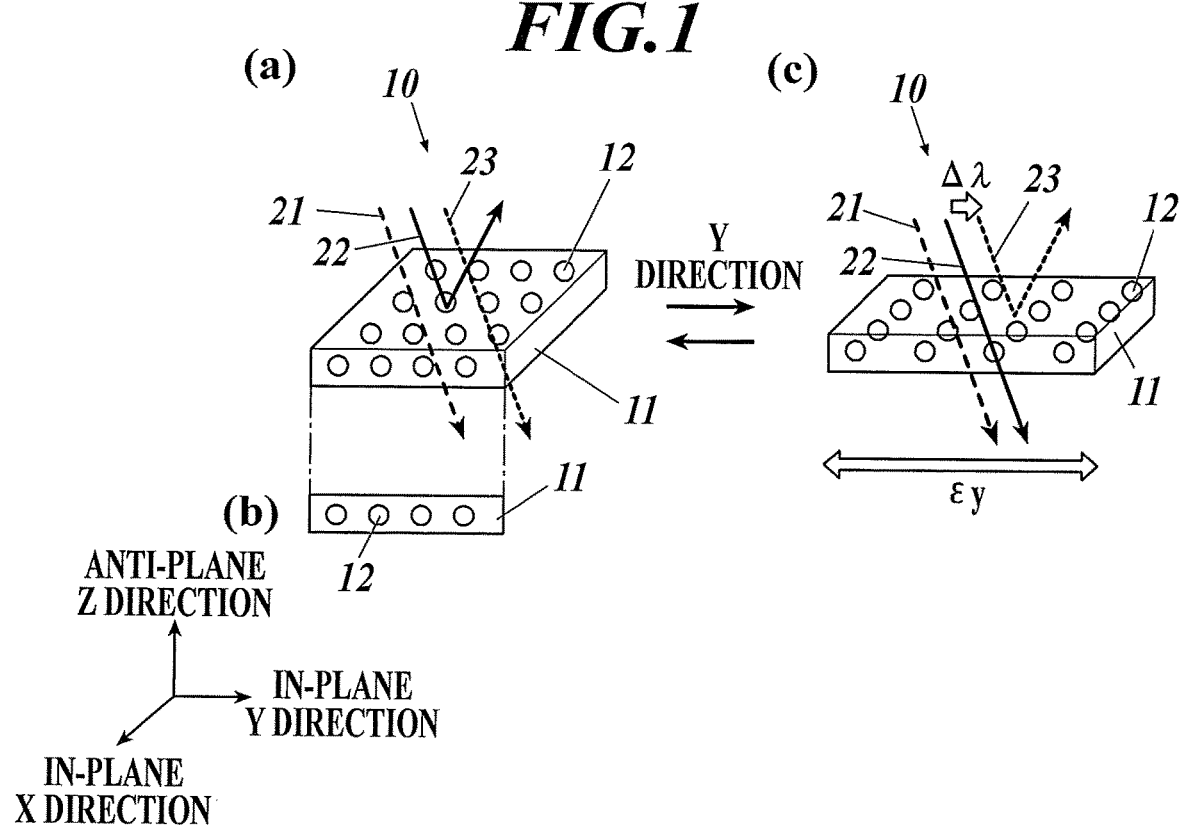
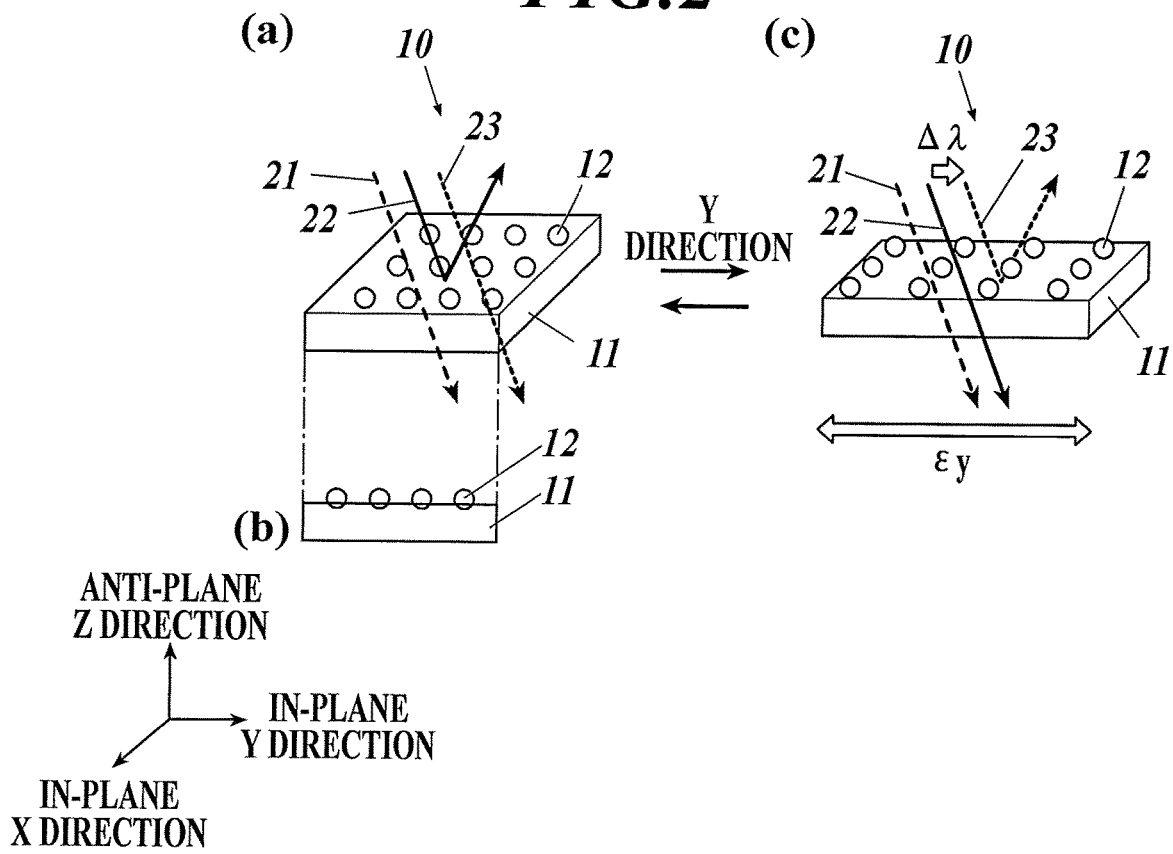

STRUCTURAL COLOR CHANGEABLE MATERIAL AND STRAIN DETECTION APPARATUS

BACKGROUND

1. Technological Field

The present invention relates to a structural color changeable material and a strain detection apparatus. In more detail, the present invention relates to a structural color changeable material that visualizes a strain in an in-plane direction as a direct change of color by means of localized surface plasmon, and a strain detection apparatus using the same.

2. Description of the Related Art

In recent years, there has been an increasing need for visualization of various physical quantities, and one of the techniques that have been considered is to detect a strain that is caused in a substance or the like. The feature of this technique is such that the strain of a material becomes instinctively recognizable to human eyes or detectable by measuring the degree of a wavelength shift with a spectrometer. For example, structural color changeable elastic materials that changes its color according to strain are disclosed regarding this technique (for example, see JP 2006-28202A and JP 2012-994A). The techniques disclosed in the patent documents are to three-dimensionally arrange nanosized dielectric particles in a rubber elastomer so that the color is changed according to strain or deformation. The techniques are to visualize the occurrence of a strain based on a change of the spacing of lattice planes of the particles by means of Bragg reflection. To be more specific, the spacing of the lattice planes of the monodispersed nanosized particles is changed according to the strain of the elastic material. The change shifts the wavelength $\lambda$ of Bragg reflection so that the color of the elastic material is changed. Since the elastic material changes its color sensitively to a local strain, it is considered applicable to films and fibers as a sensor material that visualizes the presence of stress concentration or strain.

The elastic materials disclosed in JP 2006-28202A and JP 2012-994A are suitable for visualizing a strain in the anti-plane direction with respect to the reflection surface of light but are unsuitable for visualizing a strain in an in-plane direction parallel to the reflection surface of light. Among needs for visualization of a strain, there has been a strong need for visualization of a strain caused by an external pressure or an internal change that is not in the anti-plane direction but in an in-plane direction.

SUMMARY

The present invention has been made in view of the above-described problems and circumstances, and an object thereof is to provide a structural color changeable material that visualizes the strain in an in-plane direction of a strain body as a direct change of color by means of localized surface plasmon, and a strain detection apparatus using the same.

As a result of a keen study on structural color changeable materials in order to solve the above-described problem, the present inventors have found that a structural color changeable material that can visualize a strain as a direct change of color by means of localized surface plasmon can be achieved by the following configuration:

the structural color changeable material includes a strain body in which a strain is produced by an external pressure or an internal change and surface plasmon generating particles which are contained in the strain body and which generates surface plasmon; the surface plasmon is generated by an incident light with a specific wavelength or less;

a mean particle size of the surface plasmon generating particles is equal to or less than the wavelength of the incident light; and the surface plasmon generating particles are periodically arranged parallel to an in-plane direction of a reflection surface of the incident light.

To achieve at least one of the abovementioned objects, according to an aspect of the present invention, there is provided a structural color changeable material, including:

a strain body in which a strain is produced by an external pressure or an internal change; and surface plasmon generating particles which generate surface plasmon and which are contained in the strain body, wherein the surface plasmon is generated by an incident light with a wavelength of 2400 nm or less, wherein a mean particle size of the surface plasmon generating particles is equal to or less than the wavelength of the incident light, and wherein the surface plasmon generating particles are periodically arranged parallel to an in-plane direction of a reflection surface of the incident light.

With the configuration of the present invention, it is possible to provide the structural color changeable material that visualizes the strain in an in-plane direction of the strain body as a direct change of color by means of localized surface plasmon, and the strain detection apparatus using the same.

It has not been revealed yet how the present invention works or functions to produce the advantageous effects, but it is presumed as follows.

The structural color changeable material of the present invention is configured such that the surface plasmon generating particles are contained in the strain body that is deformed by an external pressure or an internal change to produce a strain, in which the mean particle size of the particles are equal to or less than the wavelength of the incident light, and the surface plasmon generating particles are periodically arranged parallel to an in-plane direction of the reflection surface of the incident light. This configuration enables visualizing the strain in the in-plane direction of the strain body as a direct change of color.

First, problems with the technique as disclosed in JP 2006-28202A and JP 2012-994A of the prior art will be described. The technique as disclosed in JP 2006-28202A and JP 2012-994A is to provide a structural color changeable material using Bragg reflection. In the Bragg reflection, the wavelength of reflection light is determined according to the spacing of the lattice planes in the anti-plane direction. As used herein, the anti-plane direction refers to the direction perpendicular to the reflection surface of light. Accordingly, structural color changeable material using Bragg reflection has a property of changing their color according to strain in the anti-plane direction.

The usage of the structural color changeable materials as described in JP 2006-28202A and JP 2012-994A for visualization of not "a strain $\varepsilon z$ in the anti-plane Z direction" but "a strain $\varepsilon y$ in the in-plane Y direction" as a change of color will be considered. In order to visualize the in-plane strain $\varepsilon y$, it is required to convert the strain $\varepsilon y$ to the strain $\varepsilon z$.

The conversion involves the steps of the strain εy, the strain εz, a change of the lattice plane spacing D, a wavelength shift of the reflection light, and a change of color in this order.

That is, the following equation (1) is given.

Strain εz=Poisson's ratio ν×Strain εy   (1)

As seen in the above equation (1), the strain εz is determined as the product of the strain εy and the Poisson's ratio ν.

The Poisson's ratio principally falls within the range of 0.0 to 0.5. This means that εz is less than half of εy even at the maximum. That is, when the sensitivity of the change of color due to the strain εz is 1.0, the sensitivity of the change of color due to the strain εy is less than 0.5.

There is a problem here. When the structural color changeable materials as described in JP 2006-28202A and JP 2012-994A are used to visualize "the strain εy in the in-plane Y direction", the strain εz is likely to produce a noise since the change of color is more sensitive to the strain εz than to the strain εy. When it is desired to visualize only the in-plane strain εy in practice, this high sensitivity of the change of color to the strain εz is a significant factor of noise occurrence.

As described above, the structural color changeable materials as described in JP 2006-28202A and JP 2012-994A is unsuitable for visualization of the in-plane strain εy.

To cope with the above-described problem, the structural color changeable material of the present invention is based on not Bragg reflection but localized surface plasmon and is configured such that the mean particle size of the surface plasmon generating particles is equal to or less than the wavelength of the incident light, and the particles are periodically arranged parallel to an in-plane direction of the reflection surface of the incident light. This configuration enables suitably visualizing a strain in the in-plane direction.

That is, generation of localized surface plasmon can be achieved by the regular arrangement of particles of an electrically conductive material inside the strain body or on the surface of the strain body to be deformed, which is a feature of the present invention. As used herein, localized surface plasmon refers to collective electron charge oscillation of particles that are excited by incident light to cause large near-field amplification at the resonance wavelength. Accordingly, the spectrum of light that has transmitted the particles or that has reflected on the particles exhibits a peak at a specific wavelength due to the localized surface plasmon.

For example, the peak wavelength depends on the shape, the mean particle size and the particle spacing of the particles and the properties of the materials of the particles and the surrounding matrix. The present invention puts a focus on a shift of the peak wavelength, in which the peak wavelength depends on the particle spacing in the in-plane direction of the strain body. When the strain body is deformed so that the particle spacing in the in-plane direction is changed, the resonance wavelength of the localized surface plasmon is shifted accordingly. This is recognized as a change of color of the strain body, which contains the particles, to human eyes or by measuring the spectrum. That is, a structural color changeable material that directly changes its color according to a strain in an in-plane direction is achieved by the present invention.

Different from the patent documents of the prior art, the material of the present invention is characterized in that the peak wavelength is shifted according to not a strain in the anti-plane direction but a strain in an in-plane direction. This means that the sensitivity of the change of color to strain is: strain in the in-plane direction>strain in the anti-plane direction.

In view of the foregoing, it can be said that the structural color changeable material of the present invention is suitable for visualization of a strain in an in-plane direction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 1 is a schematic view of the structure of a structural color changeable material of the present invention and an example of wavelength shift caused by a strain;

FIG. 2 is a schematic view of the structure of another structural color changeable material of the present invention and an example of wavelength shift caused by a strain;

DETAILED DESCRIPTION OF EMBODIMENTS

Figure 3:
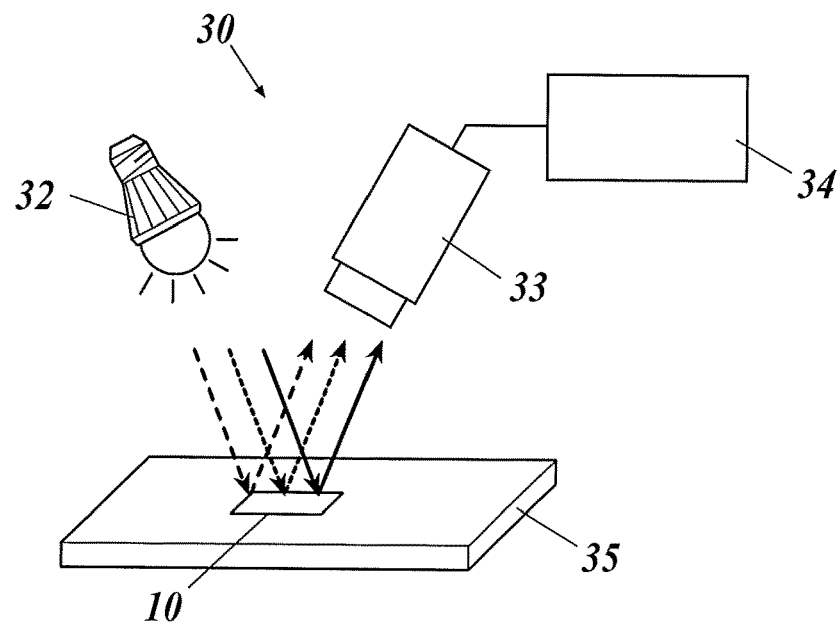
FIG. 3 is a schematic view illustrating an example of the overall configuration of a strain detection apparatus.

Hereinafter, one or more embodiments of the present invention will be described with reference to the drawings. However, the scope of the invention is not limited to the disclosed embodiments.

The feature of the structural color changeable material of the present invention is such that: surface plasmon generating particles that generate surface plasmon are contained in a strain body in which a strain is produced by an external pressure or a change of the internal structure, in which the surface plasmon is generated by an incident light with a wavelength of 2400 nm or less, the mean particle size of the surface plasmon generating particles is equal to or less than the wavelength of the incident light, and the surface plasmon generating particles are periodically arranged parallel to an in-plane direction of the reflection surface of the incident light. This feature is a common or corresponding technical feature of the claims.

In the present invention, when the surface plasmon generating particles contain a metal in the amount of 50 mass % or more, the surface plasmon can be generated in the visible region, which is preferred since the advantageous effects of the present invention can be obtained more effectively. Specifically, the peak wavelength of the reflection light in the visible region is shifted according to the strain of the strain body so that the color of the strain body is changed. This configuration is necessary when the strain of the strain body is visualized to be visible to human eyes.

When the metal is gold (Au), the plasmon resonance can be caused at the highest sensitivity in the visible region. That is, this configuration is preferred since the color is the most changeable according to the strain of the strain body.

When the surface plasmon generating particles contain an oxide semiconductor in the amount of 50 mass % or more, the plasmon resonance can be caused in the near-infrared region. Specifically, this configuration is preferred since the peak wavelength in the near-infrared region of the reflection light can be shifted according to the strain of the strain body.

It is preferred that the oxide semiconductor is zinc oxide (ZnO) since the plasmon resonance is caused at high sensitivity in the infrared region.

It is preferred that the strain body is transparent since the structural color changeable material can be used with transmitted light as well as reflection light.

It is preferred that the surface plasmon generating particles are arranged such that the distance between adjacent particles in the in-plane direction is equal to or less than the wavelength of the incident light since the color is more changeable according to the strain of the strain body.

In the structural color changeable material of the present invention, it is preferred that the distance between adjacent particles of the surface plasmon generating particles in a first in-plane direction (in which a strain in the in-plane direction is produced in the strain body) is equal to or less than the wavelength of the incident light, and the distance between adjacent particles of the surface plasmon generating particles in a second in-plane direction (which is perpendicular to the first in-plane direction) is greater than the wavelength of the incident light, where the first in-plane direction is the in-plane direction in which a strain is produced in the strain body, and the second in-plane direction is the direction perpendicular to the first in-plane direction.

This is because the change of color is sensitive only to a strain in a specific in-plane direction, which is advantageous in an application for visualizing only a strain in the specific direction as the change of color.

In the structural color changeable material of the present invention, it is preferred that the surface plasmon generating particles are periodically arranged only in the in-plane direction since the color is changed less according to the strain in the anti-plane direction of the strain body, and the color can be changed at high accuracy according to the strain in the in-plane direction of the strain body.

The strain detection apparatus of the present invention, which is used to visualize the strain in an in-plane direction of a strain body by means of surface plasmon, includes:
the structural color changeable material;
a light source that emits a beam to the structural color changeable material;
a detector that detects reflection light or transmitted light from the structural color changeable material; and
a signal processor that determines the strain of the structural color changeable material from the reflection light or the transmitted light detected by the detector.

The structural color changeable material comprises a strain body in which a strain is produced by an external pressure or an internal change and surface plasmon generating particles which are contained in the strain body and which generates surface plasmon. The surface plasmon is generated by an incident light with a wavelength of 2400 nm or less. A mean particle size of the surface plasmon generating particles is equal to or less than the wavelength of the incident light. The surface plasmon generating particles are periodically arranged parallel to an in-plane direction of a reflection surface of the incident light. This configuration enables quantitative measurement of the strain of the strain body containing the particles of the structural color changeable material. Specifically, the detector detects the reflection light or the transmitted light of the beam emitted from the light source, and the signal processor calculates the strain of the strain body containing the particles from the detected wavelength shift or change of light intensity.

Hereinafter, some embodiments of the present invention will be described. However, the embodiments that are illustrated in the following description are merely examples, and the present invention is not limited to the illustrated embodiments. As used herein, "to" is intended to mean that the numerical values before and after "to" are included as the lower and upper limit.

Configuration of Structural Color Changeable Material

First, the components of the structural color changeable material of the present invention will be described in detail. However, the specific configuration of the structural color changeable material of the present invention will be described later.

The structural color changeable material of the present invention includes a strain body in which a strain is produced by an external force or an internal change and which contains surface plasmon generating particles that generate surface plasmon.

The structural color changeable material is characterized in that:
the surface plasmon is produced by an incident light with a wavelength of 2400 nm or less;
the mean particle size of the surface plasmon generating particles is equal to or less than the wavelength of the incident light; and
the surface plasmon generating particles are periodically arranged parallel to an in-plane direction of the reflection surface of the incident light.

A reflection surface generally refers to an interface at which an incident beam is incident to a material with a different reflective index. However, as used herein, a reflection surface refers to the surface of the strain body of the structural color changeable material of the present invention. Therefore, an in-plane direction of the reflection surface refers to a direction parallel to the surface of the strain body.

Strain Body

As used herein, a strain body refers to an object in which a strain is produced by an external force or an internal change. The phrase "an external force or an internal change" refers to a load (external force acting on the object), or a thermal change, a hygroscopic change or the like. Such loads include tensile loads, compressive loads, shear loads, flexural load, torsional loads and the like.

The structural color changeable material of the present invention changes its color when an external force or an internal change as described above produces a strain in the stain body so as to change the particle spacing of the surface plasmon generating particles that are contained inside the strain body or on the surface thereof.

The strain body of the present invention may be made of any material in which a strain is produced by an applied load, and such materials include light-permeable and light-impermeable materials.

Examples of light-permeable transparent base materials (transparent bodies) include glass and a variety of resin films known in the art. Such resin films include, for example, polyester films such as polyethylene terephthalate and polyethylene naphthalate; polyethylene films; polypropylene films; cellophane; cellulose ester films such as cellulose diacetate films, cellulose triacetate films, cellulose acetate propionate films and cellulose acetate butylate films; polyvinylidene chloride films; polyvinyl alcohol films; ethylene vinyl alcohol films; syndiotactic polystyrene films; polysulfone (including polyether sulfones) films; polycarbonate films such as polycarbonate films; norbornene resin films;

polymethylpentene films; polyetherketone films; polyetherketone imide films; polyamide films; fluorinated resin films; nylon films; polyarylate films such as polymethylmethacrylate films and acryl films; and the like.

Examples of light-impermeable base materials include, metal foils such as aluminum and stainless steel, and bases such as rubber materials (e.g. silicone rubber, etc.), plate members and plastic films or sheets on which a metal film such as aluminum, copper, nickel or stainless steel is laminated.

It is preferred that the strain body of the present invention is constituted by a transparent body of a light-permeable base material since the structural color changeable material can be used also with a transmitted light. As used herein, a light-permeable or transparent body means that the base material thereof solely has an average light transmission T in the visible region of 50% or more, preferably 65% or more, more preferably 80% or more, particularly 90% or more.

Surface Plasmon Generating Particles
Plasmon Resonance

As used herein, a plasmon is a compression wave (=longitudinal wave) of electrons in metal nanoparticles excited by light. A plasmon is not generated by light in all wavelength regions, but plasmon resonance occurs when the frequency of light is the same as the natural wavelength of the surface electrons of a metal or the like.

When plasmon resonance occurs, light absorption occurs at the plasmon resonance frequency (wavelength) since the light energy at the frequency is consumed for the excitation of electron oscillation. The plasmon resonance frequency depends on the difference in refractive index (permittivity, in a broad sense) as the boundary condition between a substance such as metal having surface electrons and another substance. As the refractive index of another substance is changed, the resonance frequency is changed accordingly.

Surface plasmon resonance phenomenon falls broadly into two types of propagating surface plasmon and localized surface plasmon. In propagating surface plasmon, oscillation of free electrons in a metal surface couples with light to propagate in the metal surface. In localized surface plasmon, polarization of electrons is induced in the entire nanoparticles such as metal particles by the electric field of incident light, and the oscillation thereof generates the surface plasmon.

It has been considered to utilize propagating surface plasmon in wavelength filters and biosensors since the properties thereof are controllable by providing a microstructure in the surface of the metal of an element even when the element has a large size. However, since it is difficult to change the properties with respect to each element, it is difficult to achieve a multichannel functionality. Further, in the application as sensors, a sensitive detector is required to detect the plasmon excitation light, which is likely to result in a complex and large system. Propagating surface plasmon is disadvantageous in such points.

In contrast, the size of the apparatuses using localized surface plasmon can be readily reduced since the minimum unit of the element corresponds to a single particle of the nanoparticles. Accordingly, localized surface plasmon is suitable for multichannel biosensors and quarantine systems. The present invention is based on the localized surface plasmon.

Nanoparticles

In the present invention, it is preferred to use nanoparticles having the following configuration as the surface plasmon generating nanoparticles.

Metal Particles

In a first configuration of the surface plasmon generating nanoparticles according to the present invention, it is preferred that the particles contain a metal in the amount of 50 mass % or more since the peak frequency of the plasmon resonance can be within the visible region. In the present invention, it is more preferred that the nanoparticles contain the metal in the amount of 65 mass % or more, yet more preferably 80 mass % or more, particularly 90 mass % or more, and most preferably 99 mass % or more.

The resonance frequency $\omega_p$ of the plasmon according to the present invention can be determined by the following equation (2).

$$\omega_p = (ne^2/\varepsilon m)^{1/2} \tag{2}$$

In the equation (2), n is the electron density, e is the electron charge, $\varepsilon$ is the permittivity, and m is the effective mass.

Typical metals have the resonance frequency in the ultraviolet or visible region. When a metal material is used for the surface plasmon generating nanoparticles, it is possible to enhance the change of color by selecting the particle size within a longer wavelength region than the resonance frequency.

In the present invention, metals that can be used for the nanoparticles include gold (Au), platinum (Pt), silver (Ag), chromium (Cr), nickel (Ni), aluminum (Al), copper (Cu) and the like. Among them, gold (Au) is particularly preferred since the resonated plasmon can be generated in the visible region at the highest sensitivity.

Further, gold is a representative substance that has the plasmon resonance frequency in the visible region, and is a stable substance that hardly experience deterioration such as change over time. Further, gold is a stably supplied material. Therefore, gold is a suitable material that is used for the nanoparticles to generate plasmon.

Oxide Semiconductor Particles

In a second configuration of the surface plasmon generating nanoparticles according to the present invention, it is preferred that an oxide semiconductor is used as a material that has a peak frequency of plasmon resonance in the near-infrared region. In the present invention, it is preferred that the nanoparticles contain the oxide semiconductor in the amount of 50 mass % or more, more preferably 65 mass % or more, yet more preferably 80 mass % or more, particularly 90 mass % or more, and the most preferably 99 mass % or more.

Since the electron mobility of oxide semiconductors falls within the range of approximately $1 \times 10^{18}$ to $1 \times 10^{21}$ cm$^{-3}$, the plasmon resonance wavelength is controllable over the near-infrared region and the infrared region. This is one of the characteristics of semiconductors, which have an additional controllable parameter of electron mobility in contrast to metals with uncontrollable physical properties. With an oxide semiconductor that has a controllable plasmon resonance wavelength in the infrared region, it is possible to achieve an optimal design for the change of color.

Examples of oxide semiconductors that can be used for producing the surface plasmon generating nanoparticles according to the present invention include $TiO_2$, ITO (Indium-Tin Oxide), ZnO, $Nb_2O_5$, $ZrO_2$, $CeO_2$, $Ta_2O_5$, $Ti_3O_5$, $Ti_4O_7$, $Ti_2O_3$, TiO, $SnO_2$, $La_2Ti_2O_7$, IZO (Indium-Zinc Oxide), AZO (Aluminum-Zinc Oxide), GZO (Gallium-Zinc Oxide), ATO (Antimony-Tin Oxide), ICO (Indium-Cerium Oxide), $Bi_2O_3$, a-GIO, $Ga_2O_3$, $GeO_2$, $SiO_2$, $Al_2O_3$, $HfO_2$, SiO, MgO, $Y_2O_3$, $WO_3$, a-GIO (Gallium-Indium Oxide) and the like. Among them, it is particularly preferred to use zinc oxide (ZnO) since it can cause surface plasmon resonance at high sensitivity in the near-infrared region.

Mean Particle Size of Nanoparticles

It is one of the features of the present invention that the mean particle size of the surface plasmon generating particles is equal to or less than the wavelength of the incident light.

In the particles having the first configuration, which are made of metal and have a peak frequency of the plasmon resonance in the visible region, it is preferred that the mean particle size is equal to or less than the wavelength of the visible light, specifically equal to or less than 780 nm.

In the particles having the second configuration, which are made of oxide semiconductor and have a peak frequency of the plasmon resonance in the near-infrared region, it is preferred that the mean particle size is equal to or less than the wavelength of near-infrared light, specifically equal to or less than 2400 nm.

In the present invention, the mean particle size of the surface plasmon generating nanoparticles can be determined according to the following method.

In the present invention, the mean particle size of the nanoparticles can be readily determined by a known particle size measuring method. For example, the mean particle size can be determined with a commercially available particle size measuring instrument using light scattering, electrophoresis, laser doppler or the like, such as a particle size measuring device (Multisizer III, Beckman Coulter, Inc.) along with an analyzer software (Beckman Coulter Multisizer 3, Version 3.51). Alternatively, the mean particle size can be determined by taking particle images of at least 100 particles by a transmission electron microscope and statistically analyzing the images with an image analyzer software such as Image-Pro (Media Cybernetics, Inc.).

Method of Producing Surface Plasmon Generating Nanoparticles

To produce the surface plasmon generating nanoparticles according to the present invention, a suitable method can be selected from methods of forming inorganic fine particles known in the art.

Hereinafter, an example of the method of producing the nanoparticles that are made of oxide semiconductor of zinc oxide will be described.

(1) First, in a material solution preparing step, zinc aqueous solution for forming oxide semiconductor of zinc oxide, urea-based aqueous solution and aqueous solution containing the other additives are prepared.

(2) In a zinc-based compound precursor particle forming step, the above-described aqueous solutions are mixed and stirred at a constant temperature for a certain time to produce seed particles and to grow the seed particles, so that zinc-based compound precursor particles are formed.

(3) In a solid-liquid separating step, the zinc-based compound-containing precursor particles thus prepared are separated from the aqueous solution by solid-liquid separation.

(4) Then, the zinc-based compound-containing precursor particles thus separated are calcined at a predetermined temperature for a predetermined time so that zinc oxide particles, which are spherical oxide semiconductor, are prepared.

Next, the configuration and the technical features of the structural color changeable material and the strain detection apparatus according to the present invention will be described with drawings.

First Embodiment

A structural color changeable material according to an embodiment of the present invention includes a strain body in which a strain is produced by an applied load and surface plasmon generating particles (hereinafter also referred to as nanoparticles) contained in the strain body, and is configured such that arrays of the surface plasmon generating particles are periodically arranged parallel to an in-plane direction of the reflection surface of incident light.

In the present invention, when the surface plasmon generating particles contain a metal in the amount of 50 mass % or more, it is preferred that the wavelength of the incident light falls within the visible region of 750 nm or less. When the surface plasmon generating particles contain an oxide semiconductor in the amount of 50 mass % or more, it is preferred that wavelength of the incident light falls within the near-infrared region of 2400 nm or less.

FIG. 1 is a schematic view illustrating an example of the configuration of the structural color changeable material according to the present invention, in which the particles with a size of the wavelength of the surface plasmon generating light or less are regularly arranged inside the strain body.

FIG. 1 (a) illustrates the configuration of the structural color changeable material 10 in the state before an external pressure is applied.

In the structural color changeable material 10 as illustrated in FIG. 1 (a), the nanoparticles 12, which are surface plasmon generating particles, are regularly arranged inside the strain body 11. The arrangement is such that pluralities of nanoparticles 12 are respectively aligned in the in-plane X direction with respect to the reflection surface of the incident beam, and these arrays are periodically arranged in the in-plane Y direction. FIG. 1 (b) is a side view of the structural color changeable material 10 of FIG. 1 (a) from the in-plane X direction.

In the structural color changeable material 10 having the above-described configuration, beams 21, 22, 23 with different wavelengths are incident in the anti-plane Z direction and reach the surface of the strain body 11. In FIG. 1 (a), the beam 21 and the beam 23 transmit the structural color changeable material 10. Interaction between nanoparticles 12 and light generates surface plasmon, and only the beam 22 having a specific wavelength is reflected.

In contrast, FIG. 1 (c) illustrates the state in which an in-plane strain εy is applied to the structural color changeable material 10 in the in-plane Y by means of an external pressure.

As illustrated in FIG. 1 (c), when the in-plane strain εy is caused in the in-plane Y direction in the strain body 11 with the regularly arranged nanoparticles 12, the spacing in the in-plane Y direction of the arrays of the particles 12 arranged in the in-plane X direction is changed (expanded) according to the in-plane strain εy so that the resonance wavelength of the surface plasmon is shifted. In FIG. 1 (c), as a result of the in-plane strain εy being applied, only the beam 23 is reflected so that a wavelength shift (Δλ) occurs with respect to the condition in FIG. 1 (a). For example, in an observation by man, the wavelength shift (Δλ) can be recognized as a change of color.

In FIG. 1, the particles are not regularly arranged in the anti-plane Z direction. However, the nanoparticles 12 may also be periodically arranged in the anti-plane thickness direction (Z direction) of the strain body 11 in addition to the above-described configuration.

Second Embodiment

A structural color changeable material according to another embodiment of the present invention includes a strain body in which a strain is produced by an applied load and surface plasmon generating nanoparticles on the surface of the strain body, in which arrays of surface plasmon generating particles are periodically arranged parallel to the surface area of the reflection surface of incident light.

FIG. 2 is a schematic view illustrating another example of the configuration of the structural color changeable material 10 according to the present invention. Compared to the configuration in FIG. 1, nanoparticles 12 with a size of the wavelength of the surface plasmon light or less are regularly arranged in the in-plane X direction on the surface region of the strain body 11.

In the structural color changeable material 10 as illustrated in FIG. 2, a wavelength shift ($\Delta\lambda$) of the reflection light can also be caused when an in-plane strain $\varepsilon y$ is applied in the in-plane Y direction by means of an external pressure in the same way as described with FIG. 1 except that the nanoparticles 12 are formed on the surface region of the strain body 11.

Method of Producing Structural Color Changeable Material

As for the method of producing the structural color changeable material 10 according to the above-described first embodiment (FIG. 1), in which the nanoparticles 12 are periodically arranged inside the strain body 11, and the structural color changeable material 10 according to the above-described second embodiment (FIG. 2), in which the nanoparticles 12 are periodically arranged on the surface region of the strain body 11, the following production methods can be used for example although it is not particular limited thereto.

Methods of forming nanosized particles in or on a strain body 11 can be classified into two types of a top-down type and a bottom-up type. The top-down type is a production technique for fine processing that has been used in semiconductor processes such as lithography and nanoimprinting. The top-down type is advantageous in high design flexibility in the structure and the shape but disadvantageous in many technical constraints in the product size and the like.

The bottom-up type is a technique of building a complex structure by a spontaneous process that is based on the inherent chemical bonding and the intermolecular force of atoms and molecules without an aid of any artificial manipulation or process. The bottom-up type is suitable for producing a structure that has a periodic pattern of several nm. However, this technique is disadvantageous in the difficulty in producing a non-periodic structure, absence of established mass production techniques, etc.

The structural color changeable material having the configuration of the first or second embodiment of the present invention can be produced by either top-down type or bottom-up type method.

As a specific method of applying and arranging nanoparticles on a strain body, the technique of "fabrication of reliable nanophase-separated templates" has been recently proposed by the Iyoda group of Tokyo Institute of Technology and the like, which involves forming a nanophase-separated structure (cylinder domain) of a side-chain liquid crystal amphiphilic block copolymer having a periodic pattern on a decanano scale on a flexible polyethylene terephthalate film, for example, by a microgravure film forming method developed by Labo Co., Ltd. The nanophase-separated structure has a characteristic of being oriented in the film thickness direction when forming a thin film. This method can be used to introduce or adsorb nanosized particles of a functional substance only to a cylinder domain so as to form a regularly arranged nanoparticle structure.

Third Embodiment

Next, the strain detection apparatus using the structural color changeable material of the present invention will be described.

FIG. 3 is a schematic view illustrating an example of the overall configuration of the strain detection apparatus with the structural color changeable material of the present invention.

FIG. 3 is an example of a strain detection apparatus 30 illustrating an example of a method of measuring the strain of a strain measurement object 35, in which a structural color changeable material 10 including a strain body 11 and plasmon generating nanoparticles 12 provided thereto as illustrated in FIG. 1 and FIG. 2 is pasted on the object.

To measure the strain of the strain measurement object 35 to which the structural color changeable material 10 is provided, a strain detection apparatus 30 in FIG. 3 includes a light source 32, a detector 33 and a signal processor 34. The light source 32 emits a beam with different wavelengths as illustrated in FIG. 1 and FIG. 2 toward the structural color changeable material 10 that includes the strain body 11 and the plasmon generating nanoparticles 12 provided thereto, and the detector 33 receives the light that has transmitted through the structural color changeable material 10 or that has been reflected on it. FIG. 3 illustrates an example of a method of detecting the reflection light of the beam that has been reflected on the structural color changeable material 10. The signal processor calculates the wavelength shift $\Delta\lambda$ caused by the strain from the light received by the receiver 33. With this configuration, it is possible to detect the quantity of strain in the strain measurement object 35.

Fourth Embodiment

Figure 4:
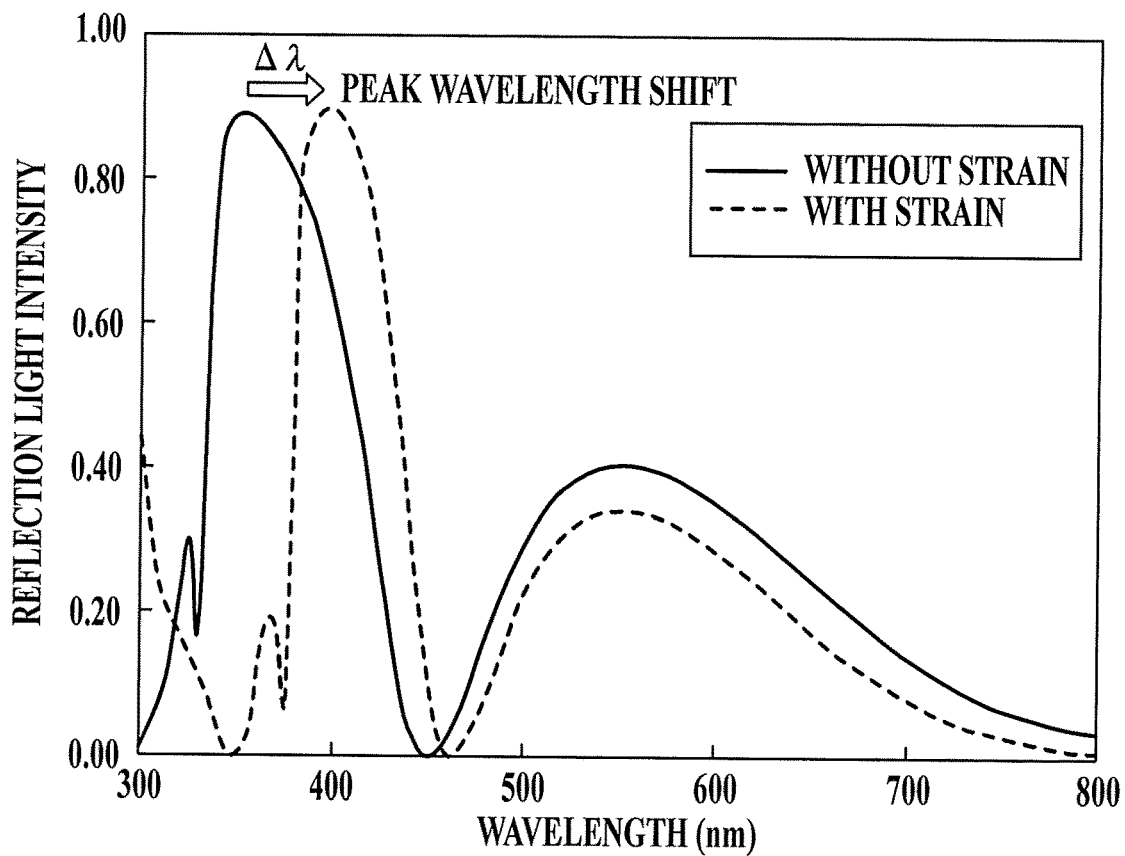
FIG. 4 is a graph of an example of the reflection spectrum of a structural color changeable material in the conditions with or without strain.

FIG. 4 is a graph illustrating a specific example (simulation) of the change of reflection spectrum (wavelength shift) of a structural color changeable material depending on the presence or absence of strain.

The graph of FIG. 4 is an example of simulation for confirming the change of the reflection spectrum according to strain in the structural color changeable material having the configuration as illustrated in FIG. 1 or FIG. 2.

In the simulation in FIG. 4, it was assumed that a strain body 11 was made of silicone rubber, and nanoparticles 12 were made of the material having the following configuration.

Material of the particles: gold (Au)
Shape of the particles: spherical
Mean particle size of the particles: 100 nm As described with FIG. 1 and FIG. 2, when a strain is produced in the strain body 11 containing the nanoparticles 12, the particle spacing of the periodically arranged nanoparticles 12 is changed. The change of the particle spacing causes a change (peak wavelength shift $\Delta\lambda$) of the resonance wavelength of the surface plasmon as described above. Accordingly, as in the example of FIG. 4, the reflection light spectrum of the strain body 11 containing the nanoparticles 12 changes depending on the presence or absence of strain, which looks like as if the peak wavelength is shifted. This means that it is seen as a change of color to human eyes.

Fifth Embodiment

Figure 5:
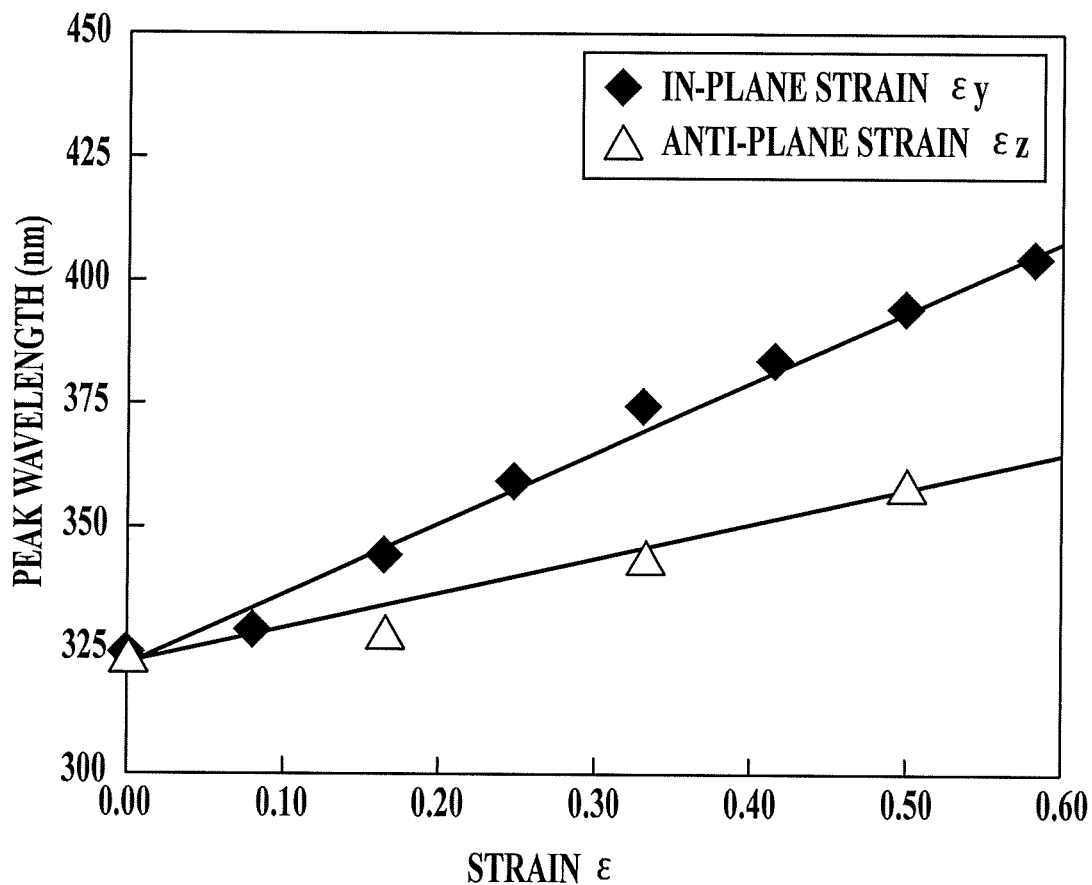
FIG. 5 is a graph illustrating an example of the relationship between strain and peak wavelength.

FIG. 5 is a graph illustrating the relationship between strain and wavelength shift when the strain body having the configuration as illustrated in FIG. 1 or FIG. 2 is deformed.

The vertical axis of the graph of FIG. 5 is peak wavelength (nm) of the reflection light spectrum, and the horizontal axis is strain (ε) of the strain body. In the graph of FIG. 5, two patterns of the strain εy in the in-plane Y direction and the strain εz in the anti-plane Z direction are plotted. Due to the localized surface plasmon, the peak wavelength of the reflection light spectrum changes according to the particle spacing in the in-plane direction in the strain body. Therefore, as seen in FIG. 5, the peak wavelength is shifted according to the strain εy in the in-plane Y direction. As shown in the above-described equation (1), the following relation is given to the in-plane strain εy and the anti-plane strain εz (=the strain in the anti-plane Z direction).

In-plane strain εy=Anti-plane strain εz×Poisson's ratio ν

The Poisson's ratio V is the ratio of the anti-plane strain εz to the in-plane strain εy perpendicular to the in-plane strain εy when the in-plane strain εy is applied to an object within the elastic limit. As with Young's modulus, Poisson's ratio is an intrinsic constant of a material within the elastic limit. Accordingly, an anti-plane strain εz indirectly produces an in-plane strain εy which also shifts the peak wavelength of the reflection light spectrum of the strain body (i.e. the color is changed). However, since Poisson's ratio is principally less than 0.5 at the maximum even though it also depends on the material. If it is assumed that εy and εz are the same, the amount of peak wavelength shift is: the peak wavelength shift caused by the in-plane strain εy>the peak wavelength shift caused by the in-plane strain εz. This can also be known from the graph of FIG. 5. From such relationship, it can be said that the present configuration is suitable for visualization of an in-plane strain rather than an anti-plane strain.

Sixth Embodiment

In the structural color changeable material of the present invention, it is preferred that the spacing of the surface plasmon generating particles in a first in-plane direction is equal to or less than the wavelength of the incident light, and the spacing of the surface plasmon generating particles in a second in-plane direction is greater than the wavelength of the incident light, where the first in-plane direction is the in-plane direction in which a strain is produced in the strain body, and the second in-plane direction is the direction perpendicular to the first in-plane direction.

Figure 6:
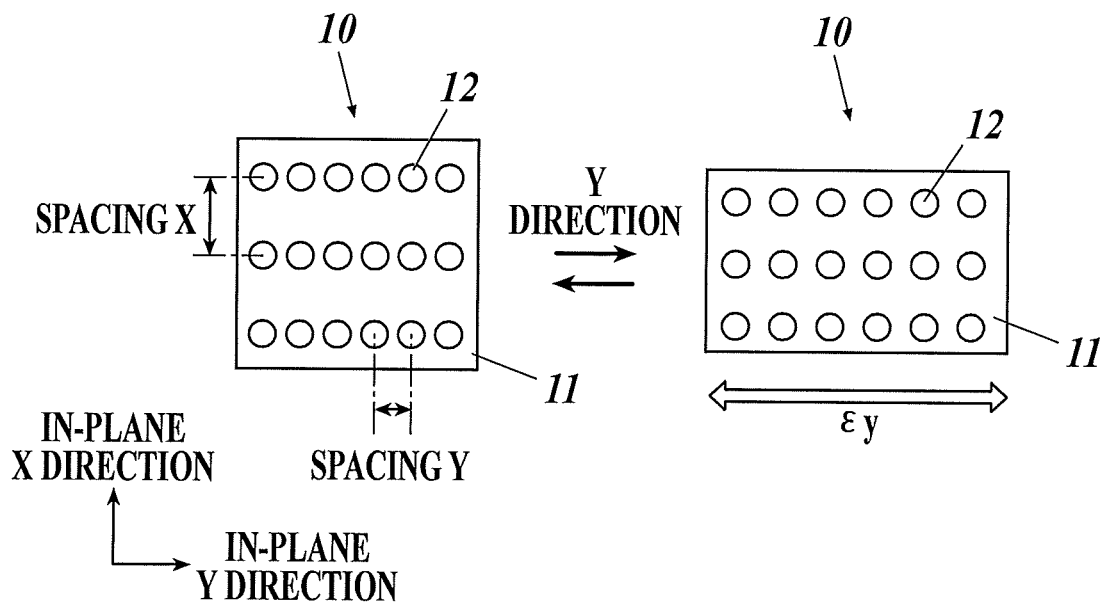
FIG. 6 is a schematic view of an example of the arrangement of nanoparticles in a structural color changeable material.

FIG. 6 is a schematic view illustrating an example of the arrangement of nanoparticles of a structural color changeable material.

FIG. 6 is a schematic view illustrating an example of the arrangement of the particles that enhances the sensitivity of the change of color to the in-plane strain εy while reducing the sensitivity of the change of color to the in-plane strain εx. Specifically, the particle spacing in the direction (in-plane Y direction) in which a strain is intended to cause a change of color is approximately equal to or less than the wavelength of the light while the direction (in-plane X direction) in which a strain is intended not to cause a change of color is greater than the wavelength of the light. By arranging the particle as described above, a material that exhibits a large degree of color change particularly in a specific in-plane direction can be achieved. In FIG. 6, the particles are arranged as "Spacing in in-plane X direction>Wavelength λ of light≥Spacing in in-plane Y direction" in order to achieve high sensitivity of the change of color to the in-plane strain εy.

The structural color changeable material of the present invention can directly visualize a strain in an in-plane direction of the strain body as a change of color and is therefore suitably applicable to the field of strain detection sensors and the like.

Although embodiments of the present invention have been described and illustrated in detail, it is clearly understood that the same is by way of illustration and example only and not limitation, the scope of the present invention should be interpreted by terms of the appended claims.

Japanese patent application No. 2016-173622 filed on Sep. 6, 2016, including description, claims, drawings, and abstract the entire disclosure is incorporated herein by reference in its entirety.

What is claimed is:

1. A structural color changeable material, comprising:
a strain body in which a strain is produced by an external pressure or an internal change; and
surface plasmon generating particles which generate surface plasmon and which are contained in the strain body,
wherein the surface plasmon is generated by an incident light with a wavelength in the near-infrared spectrum,
wherein a mean particle size of the surface plasmon generating particles is dependent upon the wavelength of incident light and is within a longer wavelength region than a plasmon resonance frequency, and
wherein the surface plasmon generating particles are periodically arranged in a plane parallel with a reflection surface of the incident light.

2. The structural color changeable material according to claim 1, wherein the surface plasmon generating particles contain an oxide semiconductor in the amount of 50 mass % or more with respect to a total mass of the particles.

3. The structural color changeable material according to claim 2, wherein the oxide semiconductor is zinc oxide.

4. The structural color changeable material according to claim 1, wherein the strain body is transparent.

5. The structural color changeable material according to claim 4, wherein the surface plasmon generating particles are arranged inside the strain body.

6. The structural color changeable material according to claim 1, wherein a distance between adjacent particles of the surface plasmon generating particles in the plane parallel with the reflection surface is equal to or less than the wavelength of the incident light.

7. The structural color changeable material according to claim 1, wherein a distance between adjacent particles of the surface plasmon generating particles in a first direction in the plane parallel with the reflection surface is equal to or less than the wavelength of the incident light, and a distance between adjacent particles of the surface plasmon generating particles in a second direction in the plane parallel with the reflection surface is greater than the wavelength of the incident light, where the first direction is a direction in which the strain is produced in the strain body, and the second direction is a direction perpendicular to the first direction.

8. The structural color changeable material according to claim 1, wherein the surface plasmon generating particles are periodically arranged only in a direction in the plane parallel with the reflection surface.

9. A strain detection apparatus for visualizing a strain in an in-plane direction of a strain body by means of surface plasmon, comprising:
a structural color changeable material;
a light source which emits a beam to the structural color changeable material;

a detector which detects a reflection light or a transmitted light from the structural color changeable material; and a signal processor which calculates the strain of the structural color changeable material from the reflection light or the transmitted light detected by the detector, wherein the structural color changeable material comprises:

a strain body in which a strain is produced by an external pressure or an internal change; and surface plasmon generating particles which generate surface plasmon and which are contained in the strain body, wherein the surface plasmon is generated by an incident light with a wavelength in the near-infrared spectrum, wherein a mean particle size of the surface plasmon generating particles is dependent upon the wavelength of incident light and is within a longer wavelength region than a plasmon resonance frequency, and wherein the surface plasmon generating particles are periodically arranged in a plane parallel with a reflection surface of the incident light.

10. The strain detection apparatus according to claim 9, wherein the surface plasmon generating particles contain an oxide semiconductor in the amount of 50 mass % or more with respect to a total mass of the particles.

11. The strain detection apparatus according to claim 10, wherein the oxide semiconductor is zinc oxide.

12. The strain detection apparatus according to claim 9, wherein the strain body is transparent.

13. The strain detection apparatus according to claim 12, wherein the surface plasmon generating particles are arranged inside the strain body.

14. The strain detection apparatus according to claim 9, wherein a distance between adjacent particles of the surface plasmon generating particles in a direction in the plane parallel with the reflection surface is equal to or less than the wavelength of the incident light.

15. The strain detection apparatus according to claim 9, wherein a distance between adjacent particles of the surface plasmon generating particles in a first direction in the plane parallel with the reflection surface is equal to or less than the wavelength of the incident light, and a distance between adjacent particles of the surface plasmon generating particles in a second direction in the plane parallel with the reflection surface is greater than the wavelength of the incident light, where the first direction is a direction in which the strain is produced in the strain body, and the second direction is a direction perpendicular to the first direction.

16. The strain detection apparatus according to claim 9, wherein the surface plasmon generating particles are periodically arranged only in a direction in the plane parallel with the reflection surface.

* * * * *